May 8, 1928.

P. O. NOBLE 1,669,099

AUTOMATIC ARC WELDING MACHINE

Filed March 26, 1927

Inventor:
Paul O. Noble,
by *His Attorney*

Patented May 8, 1928.

1,669,099

UNITED STATES PATENT OFFICE.

PAUL O. NOBLE, OF FORT WAYNE, INDIANA, ASSIGNOR TO GENERAL ELECTRIC COMPANY, A CORPORATION OF NEW YORK.

AUTOMATIC ARC WELDING MACHINE.

Application filed March 26, 1927. Serial No. 178,765.

My invention relates to automatic arc welding machines of the type wherein the welding arc is maintained between the work constituting one electrode and the welding pencil constituting the other electrode, and wherein means are provided for automatically feeding the welding pencil to maintain the arc length substantially constant during the welding operation.

Automatic arc welding machines which continually feed a welding electrode to the work and simultaneously control the rate of feeding in accordance with the voltage across the arc or some other characteristic of the arc which varies with the arc length to maintain the arc length substantially constant have been developed and are well-known in the art. Generally, these prior art machines have controlled the rate of electrode feed by varying the rate of speed of the feed motor. It is an object of the present invention to secure the desired rate of electrode feed necessary to maintain the arc length substantially constant during the welding operation by providing a welding head with means adapted to operate at a substantially constant speed for feeding the electrode toward the work and providing means for compensating for irregularities in the rate of electrode consumption or in the contour of the work by moving said head and the electrode to and from the work to maintain the arc length substantially constant.

My invention will be better understood from the following description taken in connection with the accompanying drawing, and its scope will be pointed out in the appended claims.

Figure 1:
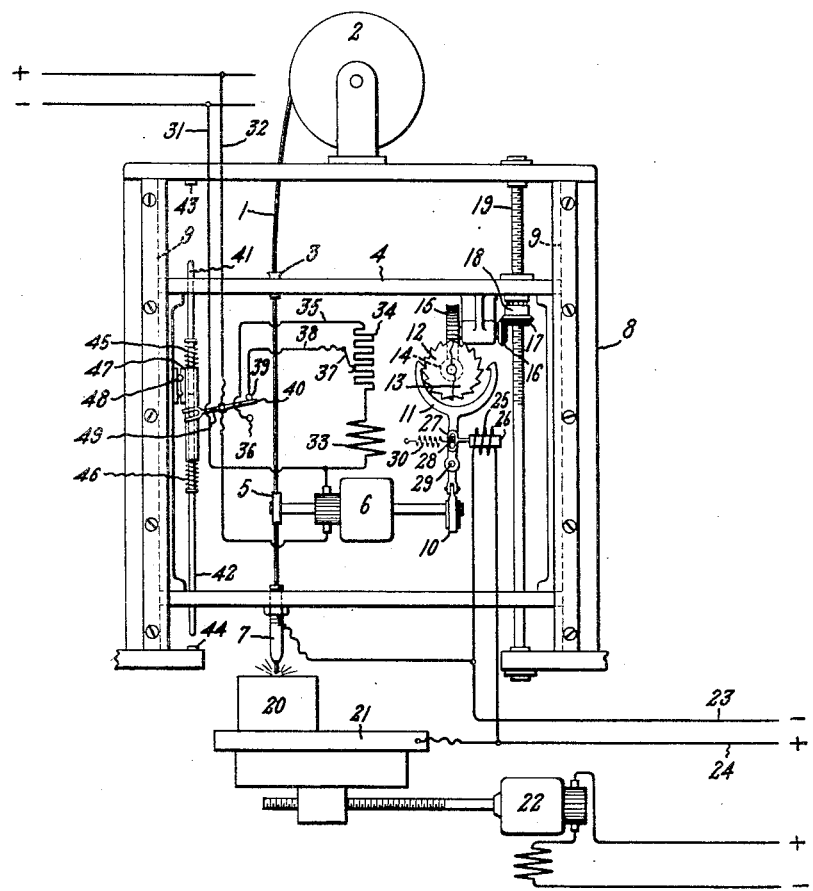
Figure 2:
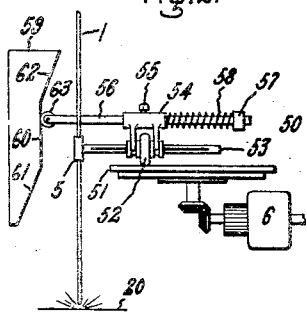

In the drawing, Fig. 1 diagrammatically shows one embodiment of my invention, and Fig. 2 shows a modification thereof.

In Fig. 1, an electrode 1 is represented as drawn from a reel 2 through a guide 3 in a welding head 4 by feed rolls 5 driven by a feed motor 6 located in the welding head. The electrode 1 is fed by the feed rolls 5 toward the work through a nozzle 7 depending from a part of the welding head 4 upon which it is mounted. The nozzle member 7 may be supported from the machine frame of which a part 8 is shown within which the welding head 4 is supported. In the arrangement shown, the welding head 4 is movably supported in grooves 9 located in the machine frame 8 and may be moved relative to the frame 8 through the action of feed motor 6 operating through an eccentric 10, pawl 11, ratchet wheels 12 and 13, worm 14, worm wheel 15, gear 16 and gear 17 which is formed integral with a nut 18 engaging a shaft 19 attached to the frame of the machine 8.

Relative movement may be produced between the electrode 1 and the work 20 supported on a table member 21 by a motor 22. The motor 22 may be arranged to traverse the work relative to the electrode at any given speed and its operation may be made dependent upon the operation of the arc so that the motor 22 will satrt as soon as the arc is struck and stop immediately upon an interruption of the welding arc by means examples of which are well-known in the art.

Welding current is supplied from a suitable source through conductors 23 and 24. In the illustration, the conductor 24 leads to the work and the conductor 23 leads to the electrode at the nozzle 7. In this case the welding current is conducted into the electrode by means of the nozzle 7, but it is, of course, apparent that other suitable means may be used for the purpose. For example, the welding current may be led into the electrode by means of the feed rolls 5 or a suitable brush mechanism may be supplied for leading current into the electrode.

Connected in shunt to the arc is a coil 25 which is responsive to arc voltage and operates in a manner subseqently to be described to maintain the arc length substantially constant. This coil 25 actuates a core member 26 to which is attached a slotted member 27. Within the slotted member 27 is a pin 28 attached to the pawl member 11, the arrangement being such that movement of the core member 26 moves the pawl member 11 about a pivot 29. Spring 30 biases the pawl member 11 toward engagement with ratchet wheel 13.

The feed motor 6 is illustrated as a shunt motor receiving its energy through conductors 31 and 32 from a suitable supply of constant electromotive force. The shunt field 33 is provided with a series resistance 34 which is connected by a conductor 35 with a contact member 36. An adjustable contact member 37 is provided for engaging the resistance 34 at points intermediate its length and is connected by a conductor 38 to a contact 39. Either contact 36 or 39 is adapted to be connected with conductor 32 and to the source of supply by a switch 40. This switch as illustrated is operated by push rod 41 or push rod 42 coming into engagement with stops 43 and 44 mounted upon the frame of the machine 8. A snap action may be given to the switch by means of springs 45 and 46 in conjunction with the notched member 47 which supports the above-referred to rods and springs and the pin member 48 attached to the welding head 4. The operating mechanism for the switch may be insulated from the conductor 31 and the source of supply by means of insulation 49.

The operation of the arrangement shown in Fig. 1 is as follows: The welding circuit 23 and 24 is connected to a suitable source of welding current and the circuit 31 and 32 and motor 22 are connected to a supply of constant electromotive force. The connection of the constant electromotive force source of supply to the conductors 31 and 32 will energize the shunt motor 6 and, due to the position of the switch 40, a predetermined amount of the resistance 34 determined by the position of adjustable contact 37 will be included in the field circuit completed through conductor 38, contact 39, and switch 40. The amount of resistance is such that the motor 6 will feed the electrode 1 toward the work 20 at a constant rate of speed which is substantially equal to the rate at which the electrode 1 is normally consumed in the arc. If, due to the nature of the electrode or an irregularity in the work, the arc length increases, the voltage across the arc will increase. This increased voltage will cause the coil 25 to move the pawl 11 into engagement with ratchet wheel 12, as illustrated, and the oscillatory movement of the ratchet 11 which is produced by the eccentric 10 on the shaft of motor 6 will feed the welding head 4 toward the work through the agency of gear train 14, 15, 16, and 17 and the nut and screw members 18 and 19 until the predetermined voltage determined by the adjustment of the electrical circuit through coil 25 or the tension of the spring 30 which opposes the action of coil 25 is again established. Thus, although the motor 6 may feed the electrode 1 at a rate insufficient to maintain the arc length at a certain value, means responsive to a characteristic of the arc is provided for advancing the welding head 4 toward the work at a sufficient rate to compensate for this insufficiency. Assuming that the insufficient rate of feed of the electrode motor 6 continues, the welding head 4 will be moved toward the work 20 until push rod 42 mounted in the welding head 4 engages the stop member 44 mounted on the frame of the machine 8. After a pretermined movement, the spring 46 surrounding the push rod 42 will be sufficiently compressed to operate member 47 relative to the latch or pin 48 and move the switch 40 from engagement with contact 39 into engagement with contact 36. The new connection through contact 36 and conductor 35, it will be noted, includes all of the resistance 34 in the shunt field circuit. If desired, the connection of conductor 35 with the resistance 34 may be made adjustable so that only a portion of resistance 34 greater than the amount previously included is inserted in the field circuit. This will produce a weakening of the field 33 and a consequent increase in the speed of the feed motor 6. Now, assuming that this increased speed of the feed motor 6 is more than sufficient to feed the electrode 1 at the rate necessary to maintain the arc length constant, it will then occur that the head 4 will be fed away from the work by the action of pawl member 11 on ratchet wheel 13 due to the decreased voltage across the operating coil 25 being insufficient to overcome the action of spring 30 on core 26. Thereafter, in a manner similar to that previously described, the head 4 will be withdrawn from the work at a rate sufficient to compensate for the excess rate of feed of the electrode 1 toward the work.

The two basic speeds of the feed motor 6 determined by the amounts of resistance included in the shunt field circuit are so adjusted that they fall on opposite sides of the average rate of feed of the electrode toward the work. If the rate of fusion of the electrode varies above or below its average, the control mechanism described will operate to compensate for this variation. Under certain conditions of operation, the welding head may stand stationary, but, when conditions require, it will move up or down relative to the work to compensate for irregularities in the rate of electrode consumption. Thus, although the electrode is fed toward the work at a substantially constant velocity relative to the feeding means, additional means responsive to a characteristic of the arc are provided for moving the feeding means to and from the work so as to alter the absolute velocity of the electrode relative to the work. If, however, the rate of feed continues to remain greater or less than it should be, the speed characteristics of the motor are changed by changing the field adjustment as described or in some other manner, examples of which are well known, for adjusting its speed. The voltage across the arc may be determined by the tension of the spring 30 or the adjustment of the amount of current flowing in coil 25 by a suitable resistance placed in series therewith. With adjustment for any given arc length the ratchet will remain out of operation as long as the arc length remains substantially unchanged.

Instead of providing means, as has been described in connection with Fig. 1, for varying the basic speeds of the feed motor by changing its electrical connection with the supply circuit, the feed motor 6 may be maintained at a constant speed and suitable variations in the rate of electrode feed mechanically produced as by adjusting the transmission between the motor 6 and the feed rolls 5. Such an arrangement is shown in Fig. 2. In Fig. 2, only so much of the welding machine shown in Fig. 1 is illustrated as is necessary to illustrate this variation. Feed motor 6 is connected with the feed rolls 5 through the variable speed gearing 50. This gearing, in the arrangement illustrated, comprises two friction members 51 and 52, the first of which is driven by the motor 6, and the second of which drives the feed rolls 5. The member 52 is splined to a shaft 53 upon which it may be moved by yoke member 54 attached by a set screw 55 to a shaft 56. Shaft 56 is suitably supported in the welding head as by a member 57 and is biased by spring 58 acting against the supporting member and the yoke member 54 in a manner to force it into engagement with a cam member 59 which may be attached to the machine frame 8. This cam is provided with a straight portion 60 and two sloping portion 61 and 62. The rod 56 may be provided with a cam roller 63 for engaging these surfaces 60, 61 and 62.

With the arrangement described in Fig. 2 the operation will be as follows: If the rate of electrode feed is less than it should be, the welding head 4 will be moved relative to the frame of the machine 8 toward the work in a manner such as has been described in connection with Fig. 1. When, however, the cam follower 63 leaves the straight surface 60 and comes into engagement with the tapered surface 61, spring 58 will move the yoke 54 and it in turn the friction member 52 further from the center of the member 51 with which it coacts in a manner to increase the speed of the feed rolls 5. This results from the fact that the feed motor 6 is revolving the friction member 51 at a constant rate of speed and, if friction member 52 is placed nearer the periphery of the member 51, the speed of revolution of member 52 is increased. In this manner the rate of electrode feed will be corrected. In a corresponding manner, if the rate of electrode feed were too great, the welding head 4 would be moved from the work, and the follower 63 would then eventually come into contact with the cam surface 62 whereupon the friction member 52 would be forced nearer the center of the friction member 51 and the speed of the feed rolls 5 correspondingly decreased.

It will thus be seen that I have provided in an automatic arc welding machine means operating at a substantially constant rate of speed for feeding the welding electrode to the work and other means for modifying the action of the first means in order to compensate for irregularities in the rate at which the welding electrode is consumed in the welding arc or irregularities in the contour of the work.

Where the welding current is supplied from a constant potential source through a series stabilizing resistance, and the potential of the source is relatively low, variations in arc length are accompanied not only by variations in the voltage across the arc, but also by variations in the current through the arc. The usual arc voltages are between about 10 and 25 volts as lower and upper limits. If the potential of the source is 40 volts, for example, and the normal arc voltage is 20 volts, slight changes in arc length will be accompanied by changes in current of the same percentage. If the normal arc voltage is 20 volts and the potential of the source 60 volts, the current will change by about one-half the percentage that the arc voltage changes for slight changes in arc length. In such systems, it will be apparent to those skilled in the art that the control magnet 25, shown as responsive to the arc voltage, may be made responsive to changes in arc current. In such an arrangement, where the current is to be adjusted for different values, a simultaneous adjustment will be made in the control magnet. While a constant potential source with a series resistance has been mentioned, it is apparent that an inherently regulated generator may be used to supply the arc, without using a series stabilizing resistance. Examples of such inherently regulated generators which may supply an arc without a series stabilizing resistance are well-known in the art. The amount of work necessary to be done by the head adjusting means is reduced in systems where the current thus changes substantially with changes in arc length, for the reason that the changes in current tend of themselves to correct variations in arc length. For example, if the arc momentarily decreases below the desired normal length, due for example to a decrease in rate of fusion of the electrode or a rise in the contour of the work, the welding current will increase, and thereby increase the rate at which the electrode melts, thereby tending to restore the arc length. Conversely, if the arc tends to become too long, the corresponding decrease in current reduces the rate of fusion of the electrode, again tending to restore the arc to the desired normal length. Where arc voltage responsive means is used for adjusting the position of the welding head, the operation of such means is independent of the current through the arc, and the apparatus may be used whether the current varies with the arc length or remains constant. It is also apparent that the means I have disclosed for controlling the arc length may be used with an alternating source of welding current as well as with a direct current source.

While I have shown and described certain embodiments of my invention, I do not intend to be confined to the particular arrangements shown and described since it is obvious to those skilled in the art that further modifications are possible, and I, therefore, aim in the appended claims to cover all such modifications and variations as fall within the true spirit of my invention.

What I claim as new and desire to secure by Letters Patent of the United States is:

1. Apparatus for electric arc welding comprising electrode feeding means, means for adjusting the position of said feeding means, and means controlled by the position of said feeding means for adjusting the rate of electrode feed.

2. In an arc welding apparatus of the type wherein the welding arc is maintained between the work constituting one electrode and the welding pencil constituting the other electrode, means for feeding the welding pencil at a speed approximately equal to its average rate of consumption in the arc, means responsive to a characteristic of the arc which varies with the arc length for moving said feeding means and the welding pencil to and from the work to maintain the arc length substantially constant, and means controlled by the movement of said means for adjusting the speed of said feeding means.

3. In an arc welding apparatus of the type wherein the welding arc is maintained between the work constituting one electrode and a welding pencil constituting the other electrode, a welding head comprising means adapted to feed the welding pencil at a speed approximately equal to its average rate of consumption in the arc, means responsive to a characteristic of the arc which varies with the arc length for moving said head to and from the work to correct variations in arc length, and means responsive to a predetermined movement of said head away from the work for decreasing the rate at which the pencil is fed and responsive to a predetermined movement of said head toward the work increasing the rate at which the pencil is fed.

4. In an arc welding machine wherein the welding arc is maintained between the work constituting one electrode and a welding pencil constituting the other electrode, a welding head comprising motor means adapted to operate at a substantially constant speed to feed the welding pencil toward the work, means responsive to a characteristic of the arc which varies with the arc length for moving said head to and from the work to maintain the arc length substantially constant, and means responsive to a predetermined movement of said head for adjusting the speed of said motor.

In witness whereof, I have hereunto set my hand this 23rd day of March, 1927.

PAUL O. NOBLE

CERTIFICATE OF CORRECTION.

Patent No. 1,669,099.              Granted May 8, 1928, to

PAUL O. NOBLE.

It is hereby certified that error appears in the printed specification of the above numbered patent requiring correction as follows: Page 1, line 72, for the misspelled word "satrt" read "start"; page 3, line 35, for "portion" read "portions"; page 4, line 58, claim 3, before the word "increasing" insert the word "for"; and that the said Letters Patent should be read with these corrections therein that the same may conform to the record of the case in the Patent Office.

Signed and sealed this 10th day of July, A. D. 1928.

(Seal)

M. J. Moore,
Acting Commissioner of Patents.